(12) United States Patent
Andersen

(10) Patent No.: US 6,532,895 B1
(45) Date of Patent: Mar. 18, 2003

(54) FEEDING PAN AND FEEDING SYSTEM, ESPECIALLY FOR POULTRY, SUCH AS CHICKENS, AND USE THEREOF

(75) Inventor: Søren Andersen, Ølgod (DK)

(73) Assignee: Landmeco Ølgod A/S, Ølgod (DK)

(*) Notice: Subject to any disclaimer, the term of this patent is extended or adjusted under 35 U.S.C. 154(b) by 0 days.

(21) Appl. No.: 09/913,108
(22) PCT Filed: Feb. 3, 2000
(86) PCT No.: PCT/DK00/00045
§ 371 (c)(1),
(2), (4) Date: Oct. 15, 2001
(87) PCT Pub. No.: WO00/49857
PCT Pub. Date: Aug. 31, 2000

(30) Foreign Application Priority Data
Feb. 9, 1999 (DK) .................................. 1999 00057 U

(51) Int. Cl.[7] .............................................. A01K 61/02
(52) U.S. Cl. ....................................................... 119/57.4
(58) Field of Search .............................. 119/57.4, 57.5, 119/57.3, 53

(56) References Cited

U.S. PATENT DOCUMENTS

| | | | | |
|---|---|---|---|---|
| 3,811,412 A | * | 5/1974 | Murto et al. | 119/53 |
| 4,348,988 A | * | 9/1982 | Lawson | 119/53 |
| 4,476,811 A | * | 10/1984 | Swartzendruber | 119/53 |
| 5,007,380 A | * | 4/1991 | Badia et al. | 119/53 |
| 5,097,797 A | * | 3/1992 | Van Zee et al. | 119/57.4 |
| 5,101,766 A | * | 4/1992 | Runion | 119/53 |
| 5,113,797 A | * | 5/1992 | van Daele | 119/53 |
| 5,406,907 A | * | 4/1995 | Hart | 119/53 |
| 5,642,688 A | * | 7/1997 | Bannier et al. | 119/53 |
| 5,762,021 A | | 6/1998 | Horwood et al. | |
| 5,927,232 A | | 7/1999 | Pollock | |

FOREIGN PATENT DOCUMENTS

| | | |
|---|---|---|
| EP | 0815726 | 1/1998 |
| WO | WO 9742810 | 11/1997 |

* cited by examiner

*Primary Examiner*—Thomas Price
(74) *Attorney, Agent, or Firm*—Kilpatrick Stockton LLP

(57) ABSTRACT

The invention concerns a feed pan for poultry, especially chickens and hens, for use in connection with a tube feeding system. The feed pan comprises a feed cone (1) under which a bottom pan (10) is mounted, and the feed cone (1) has mounting elements for mounting on a feed tube (20), so that feed from an outlet hole (21) in the feed tube (20) can pass through the feed cone (1) and down into the bottom pan (10). The mounting elements for the feed cone are configured so that the feed cone (1) and the feed tube (20) can be turned in relation to each other around the axis of the feed tube. The mounting elements comprise adjustable means which can co-operate with driving elements (6, 7) on the feed cone (1), so that the feed cone can also be turned together with the feed tube (20), which among other things is used in connection with the dosing of feeds and cleaning of feed pans.

19 Claims, 12 Drawing Sheets

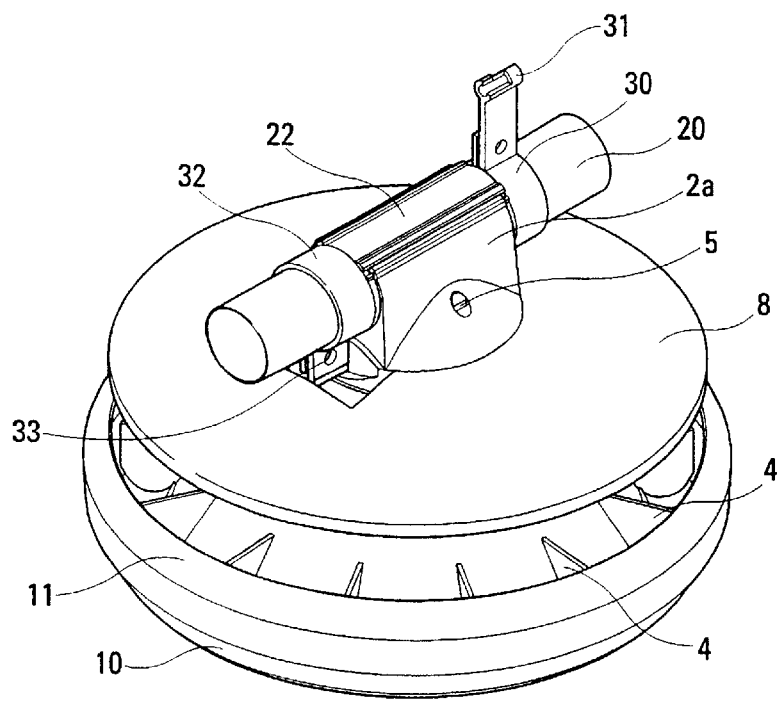
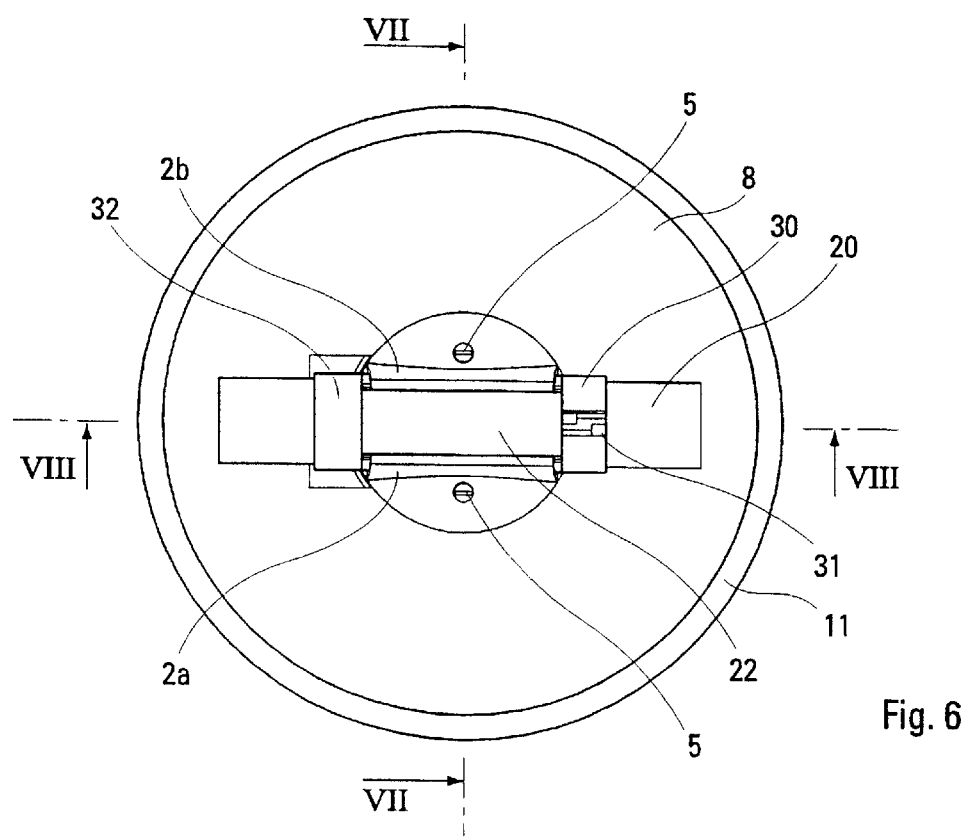
Fig. 5
Fig. 6

FEEDING PAN AND FEEDING SYSTEM, ESPECIALLY FOR POULTRY, SUCH AS CHICKENS, AND USE THEREOF

BACKGROUND OF INVENTION

The invention concerns a feed pan, especially for poultry such as chickens and hens, for use in connection with a tube feeding system. The feed pan comprises a feed cone under which a bottom pan is mounted, and the feed cone has mounting elements for mounting on a feed tube, so that feed or similar material can flow from an outlet hole in the feed tube through the feed cone and down into the bottom pan, and so that the feed cone and the feed tube can be turned in relation to each other around the axis of the feed tube.

As mentioned, such a known feed pan is intended for mounting on a feed tube, in that as a rule several feed pans are disposed at suitable intervals on such a feed tube, and so that the feed pans are disposed immediately above the floor. At its one end the feed tube is connected with a silo or the like in which feeds or the like are stored, and the tube is provided with a transport system for the feeds or the like. This transport system is most often in the form of a worm conveyor, which is driven by a motor, which can be mounted at the other end of the feed tube.

The known feed pan is mounted on the feed tube by an upper part of the feed cone being assembled around the feed tube and secured, for example, by a screw assembly. The feed cone is mounted on the feed tube in a suitably loose manner, so that the feed pan can be turned around the axis of the feed tube, which for example is used in the emptying and cleaning of the feed pan. However, such an assembly requires that the feed pan is secured against being pushed away from its position on the feed tube, i.e. where the outlet opening is placed, which with the known feed pan is effected by clamps or the like being fastened around the feed tube on each side of the feed cone.

With the known feed pan, it is not possible to ensure that the same amount of feed is transported to all of the feed pans which are mounted on the same feed tube, in that normally there will be more feed dispensed in the feed pans which lie close to the feed silo than in the more remote feed pans. Moreover, it is not possible to effect a more accurately estimated dispensing by means of the known feed pans.

A feed pan of a similar kind is also known from U.S. Pat. No. 5,778,821. This publication shows a feed pan, which is suspended on a feed tube in such a manner, that the feed pan can be turned in relation to the feed tube. Moreover, the feed tube and the feed pan are configured with the view to ensuring that the dispensing of the feed does not depend on how far the individual feed pan is disposed from the supply end of the feed tube. There can thus be inserted a special insert in the feed cone to limit the down-flow into the feed pans which lie closest to the supply end of the feed tube, or as appears from another embodiment in the publication there can be used a feed tube where the outlet holes are provided on the side of the feed tube and at different heights, so that the feed pans which lie closest to the supply end of the feed tube are associated with an outlet hole which is placed relatively high, while the feed pans which lie furthest away are associated with an outlet hole which is placed relatively low.

However, this known arrangement is encumbered with the disadvantage that the feed pans must either be specially adapted depending on their positioning, i.e. depending on their distance from the feed silo, or the feed tube with its outlet holes must be specially configured in relation to the application, in that the positioning of the outlet holes on the feed tube must be calculated for each feed pan depending on the distance from the feed silo.

BRIEF SUMMARY OF THE INVENTION

The object of the present invention is to rectify these disadvantages with the known feed pans, and at the same time to provide a feed pan which has more flexible application possibilities than the known feed pans.

This is achieved in that the feed cone is configured in such a manner that after a first turning of the feed tube in relation to the feed cone, the outlet hole in the feed tube will be closed, and in that the mounting elements for the feed cone are configured in such a manner that the mounting elements comprise means of adjustment which can co-operate with driving elements on the feed cone, so that the feed cone can also be turned together with the feed tube.

A wide range of possibilities for the utilisation of the feed pan is hereby achieved. By a turning of the feed tube, the feed pan can thus remain in its hanging-downwards position, but by a further turning, depending on the setting of the means, which co-operate with the driving elements, the feed pan will also be turned around with the feed tube. This can be used in the emptying and/or cleaning of the feed pans, in that with a first turning of the feed tube the outlet holes in the feed tube will now lie in a position in which they are closed off by the upper part of the feed cone. With a further turning, the feed pans will be turned further by means of the driving elements, and the feed pans can thus be moved over into a position in which they are turned approx. 90° in relation to the normal position. Here, the feed pans can easily be emptied of remaining feed and the feed pans can be cleaned, for example by hosing down, without there being any risk that water and cleaning agent can penetrate into the feed tube, in that the outlet holes in the feed tube are, as mentioned, closed by the upper part of the feed cone.

Moreover, a precise dosing of the feed can be effected without the necessity of having to modify the individual feed cones or to configure the outlet holes on the feed tube in a special manner, such as is otherwise required by the technique which is known from the said US patent publication, in that at the same time by means of the invention all of the feed pans on the same feed tube can be provided with the same amount of feed. This can be effected by turning the feed tube approximately a quarter of a turn, so that the outlet holes are closed off. Here it is a condition that the adjustable means are in a position in which within the first quarter of a turn they do not enter into engagement with the driving elements. In this position, the feed transport system can be activated so that the feed tube is completely filled up with feed, after which the feed tube is turned back to its original position so that the outlet holes are opened again. The transport system can then be activated for a given period of time, or for a given number of revolutions e.g. of a worm conveyor, so that a certain and previously known amount of feed will fall down into each feed pan. With renewed filling of the feed pans, the sequence described is repeated.

Moreover, if this is desired, it will be possible to set the means which co-operate with the driving elements so that the feed pan is turned together with the feed tube from the start of the turning movement, and it will also still be possible to turn the feed pan around the feed tube in a purely manual manner, i.e. without the feed tube being turned, so that each individual feed pan can be turned manually.

The mounting elements can expediently comprise a driving strap with a driving arm. The driving elements on the feed cone can consist of a driving pin, whereby the driving arm rotates the feed pan when it engages with the driving pin, but where the feed pan follows the driving arm in the reverse direction only until the feed pan reaches its normal hanging-downwards position.

The driving elements can also comprise a slot into which the driving arm can be pushed, so that the feed pan follows the driving arm and therewith the feed tube in all movements.

The mounting elements can expediently comprise a gripping element which partially surrounds the feed tube, and which is secured by means of a lock part which can be partially tubular, and which along the feed tube is pushed into the gripping element. Hereby a particularly easy and simple mounting of the feed pan on the feed tube is achieved, in that the feed cone's gripping element, which can be resilient, is pushed up around the feed tube, after which the lock part is pushed into place. The known arrangements with screw assemblies and the like are hereby avoided, and the dismounting of a feed pan can be effected in a similarly easy and simple manner.

Since the feed pan is not fastened firmly on the feed tube, but can be moved, it is expedient for the mounting elements to comprise parts which prevent the feed pan from being moved in the longitudinal direction of the feed tube away from the outlet hole for the feed. These parts can consist of the driving strap on the one side of the feed pan and a further retaining strap on the other side.

With a further expedient embodiment of the invention the bottom pan is mounted on the feed cone by means of a threaded rod and a mounting nut corresponding hereto. The distance between the bottom pan and the feed cone can hereby be regulated in a simple manner, so that a suitable distance is achieved with regard to the feed, which is used.

With a particularly expedient embodiment the mounting nut is configured so that it can be pressed in on the threaded rod from the side. It is thus not necessary to screw the nut all the way up from the end of the threaded rod, in that the nut can be "clipped" on the rod at a suitable place, after which a fine adjustment can be carried out in the normal way. Moreover, the mounting nut has a pair of gripping fingers which when pressed together will open the nut so much that it can be drawn sideways off the threaded rod. The separation of the bottom pan and feed cone can thus be effected in a quick and simple manner.

The lock part can expediently be configured with an arm, which has a through-going hole for mounting of a stabilizing bar. It is hereby avoided that one or more feed pans get completely or partly stuck on the feed tube.

The lock part can expediently be configured so that it can be provided with a mounting part, e.g. by clipping on, for the securing of a bottom pan.

Furthermore, on parts of the feed pan there can be configured parts which can grip around a wire or the like which extends up over and at a distance from the feed tube. It is hereby prevented, for example, that hens or chickens can perch on top of the feed tube.

The invention also concerns a feeding system especially for the feeding of poultry such as hens and chickens, said feeding system comprising a feed tube with a number of feed pans, a feed silo or a similar reservoir for feeds and a transport system for conveying the feed through the feed tube to the feed pans.

The system can expediently be configured in a manner whereby it is achieved that the same given amount of feed can be dispensed to each of the feed pans associated with a feed tube in the system. This can be done by turning the feed tube approximately a quarter of a turn in relation to the normal position, so that the outlet holes are closed off. Here it is a condition that the adjustable means are in a position in which they do not engage with the driving elements within the first quarter of a turn. In this position, the feed transport system can be activated so that the feed tube is completely filled with feed, after which the feed tube is turned back to its original position so that the outlet holes are opened again. The transport system can then be activated for a given period of time or for a given number of revolutions e.g. of a conveyor worm, so that a certain and previously known amount of feed will fall down into each feed pan. For a renewed filling of the feed pans, the described sequence is repeated.

Finally, the invention concerns the use of a feed pan or feeding system.

BRIEF DESCRIPTION OF THE FIGURES

In the following, the invention will be explained in more detail with reference to the drawing, in which FIG. 5 shows a feed pan according to the invention, shown in perspective, FIG. 6 shows the same feed pan as in FIG. 5, seen from above.

DETAILED DESCRIPTION OF THE INVENTION

A feed pan according to the invention consists substantially of two main components, i.e. a feed cone and a bottom pan.

Figure 1:
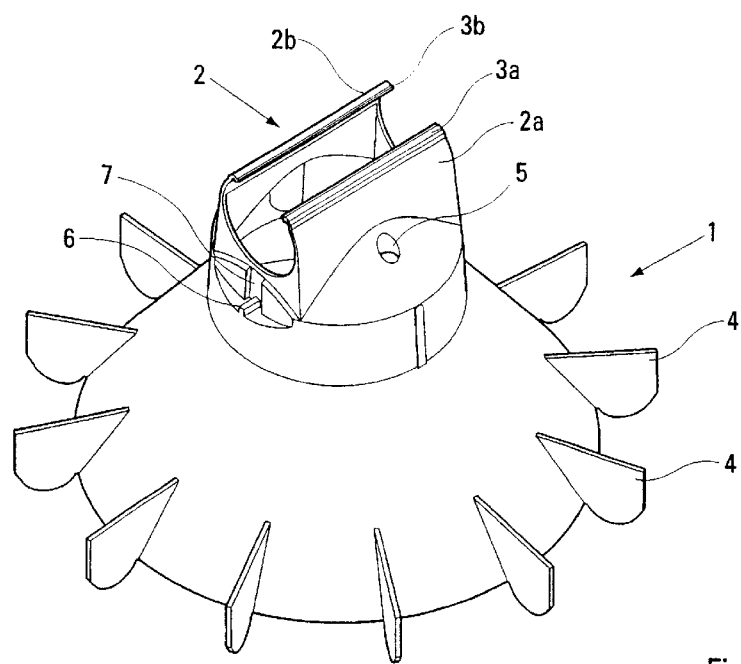
FIG. 1 shows a feed cone for a feed pan according to the invention, shown in perspective.
Figure 2:
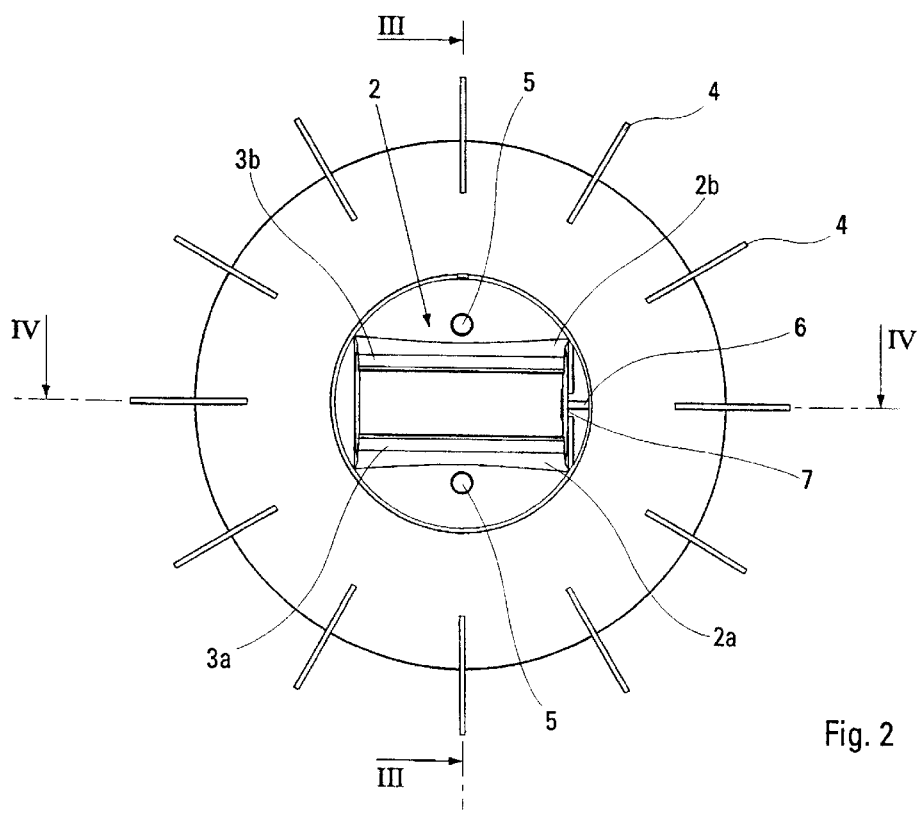
FIG. 2 shows the same feed cone as in FIG. 1, seen from above.
Figure 3:
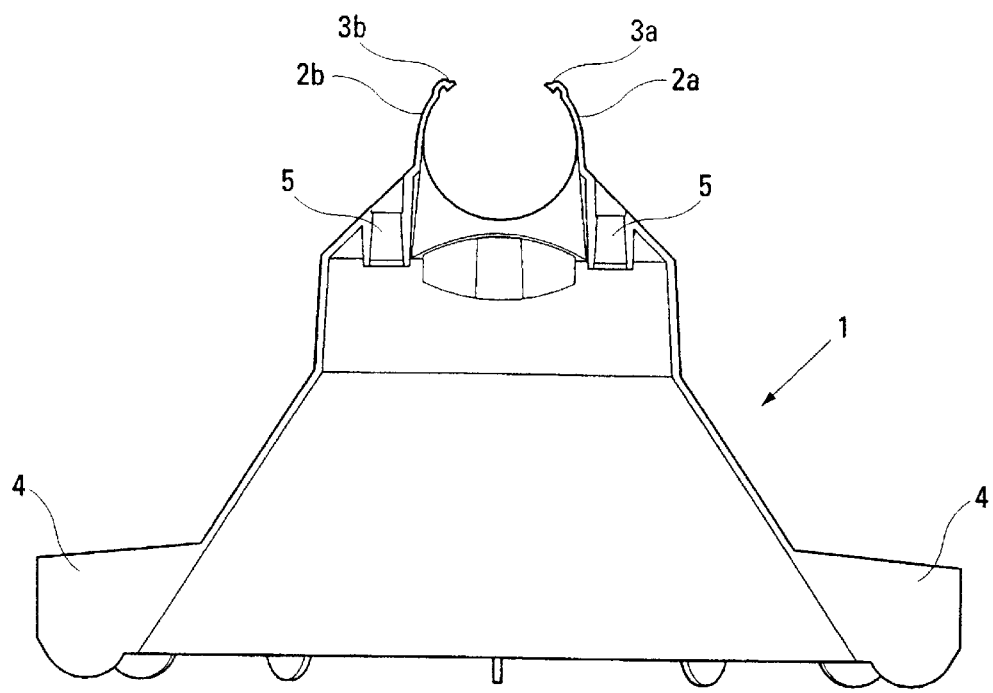
FIG. 3 shows a cross-section of the feed cone along the line III—III in FIG. 2.
Figure 4:
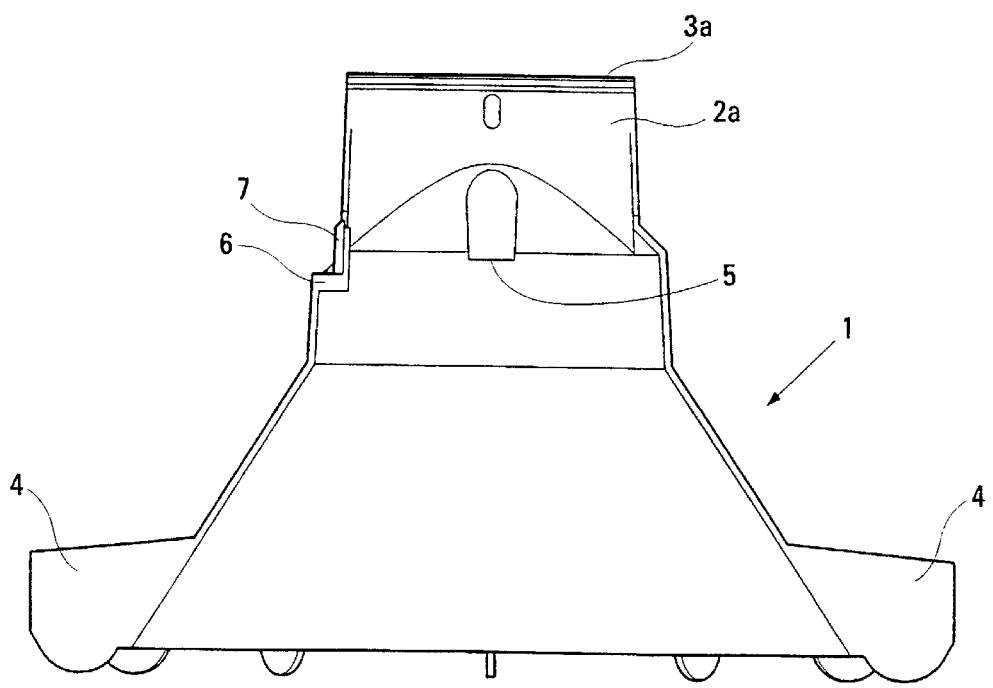
FIG. 4 shows a longitudinal section of the feed cone along the line IV—IV in FIG. 2.

A feed cone 1 for a feed pan according to the invention is shown in the FIGS. 1–4, where FIG. 1 shows the cone in perspective, FIG. 2 is a view of the feed cone seen from above, FIG. 3 shows a section of the feed cone along the line III—III in FIG. 2, and FIG. 4 shows a section of the feed cone along the line IV—IV in FIG. 2. As will be seen in these drawings, the feed cone is a hollow element with a large opening at the bottom and a smaller opening at the top. At the bottom outside edge, the element is provided with a number of vanes 4 evenly spaced along the edge. The function of these vanes will be described later.

The top of the feed cone 1 is provided with a gripping element 2 which is configured as a longitudinal channel which is open both upwards and downwards, and which has elastic or resilient side pieces 2a and 2b so that the gripping element 2 can be pressed up around a feed tube. The gripping element 2 is configured at its ends with end pieces with circular cut-outs which fit the shape of the tube, and at the upwardly-facing edges the side pieces 2a and 2b are provided with inwardly-facing locking edges 3a and 3b, the function of which will be described in more detail later.

At the one end of the gripping element 2 there is disposed a driving pin 6 and also a driving slot 7. To each side of the gripping element 2 there is also a through-going hole 5 which extends more or less vertically through the walls of the feed cone, and which is used for securing a bottom pan as described in the following.

FIGS. 5–8 show a feed pan which is mounted on a feed tube 20, of which only a small part of the length is shown in the figures. The feed tube, on which a number of feed pans are normally mounted, extends as a rule between a feed silo at the one end and a drive station at the other end, in that by means of a motor the drive station drives a worm in the feed tube. As is shown by way of example in FIGS. 7 and 8, inside the feed cone 1 a bottom pan 10 is mounted which is arranged to fit the shape of the inside of the feed cone, so that an annular slot-shaped passage for the feed is formed between the walls of the feed cone and the bottom pan. At the bottom of the feed pan, the bottom pan 10 forms an annular edge 11, which surrounds the lowermost part of the feed cone 1 where the vanes 4 are placed. These "scraper vanes" 4 prevent the chickens from hopping up into the bottom pan 10 to scrape in the feed. In the middle, the bottom pan 10 extends up into a central part where a mounting hole 12 for the bottom pan is formed. A threaded rod 15 extends through this mounting hole 12, said rod being mounted on the feed cone 1 by means of a mounting bridge 13. This mounting bridge is connected to the feed cone by means of screw assemblies 14 through the mounting holes 5 in the feed cone 1, such as shown by way of example in FIG. 7. The bottom pan 10 is fastened on the threaded rod 15 by means of a mounting nut 17, so that the distance between the feed cone 1 and the bottom pan 10 can be adjusted, and so that the bottom pan can be dismounted, for example for the emptying or the cleaning of the feed pan.

The feed pan shown in FIGS. 5–8 is also provided with a removable covering hood 8. This hood is not a necessary part of the feed pan, but its use can prevent hens or chickens over a certain size from using the feed pan.

In FIGS. 5–8, the feed cone's gripping element 2 is pressed up on a feed tube 20 where it is secured by means of a lock part 22, which along the feed tube 20 is pushed into the gripping element 2. This function will be described in more detail later in connection with FIG. 9. After the lock part 22 has been mounted, the feed pan thus hangs movably in relation to the feed tube, and in order to ensure that the feed pan is not inadvertently pushed away from its position at the outlet hole 21 in the feed tube (shown by way of example in FIG. 8), a strap is mounted on each side of the gripping element 2.

On the one side a locking strap 30 is fastened, which has an arm with a grip part 31. This grip part is intended to face upwards and can hold a wire, a cable, a cord or the like extending in the full length of and at a certain distance above the feed tube, and which prevents hens and chickens from perching on the feed tube 20. On the other side a driving strap 32 is fastened, which has a driving arm 33. This driving arm 33 is of such a length that when the feed tube 20 is turned in relation to the feed pan, the arm will engage with the driving pin 6 on the feed cone 1. Moreover, when the driving arm 33 is opposite the driving slot 7, the driving strap 32 can be pushed further in towards the feed cone 1, whereby the driving arm 33 can enter into engagement with the driving slot 7. When the driving strap 32 is fastened in this position, the feed pan will consequently be locked fast in relation to the feed tube 20.

Figure 9:
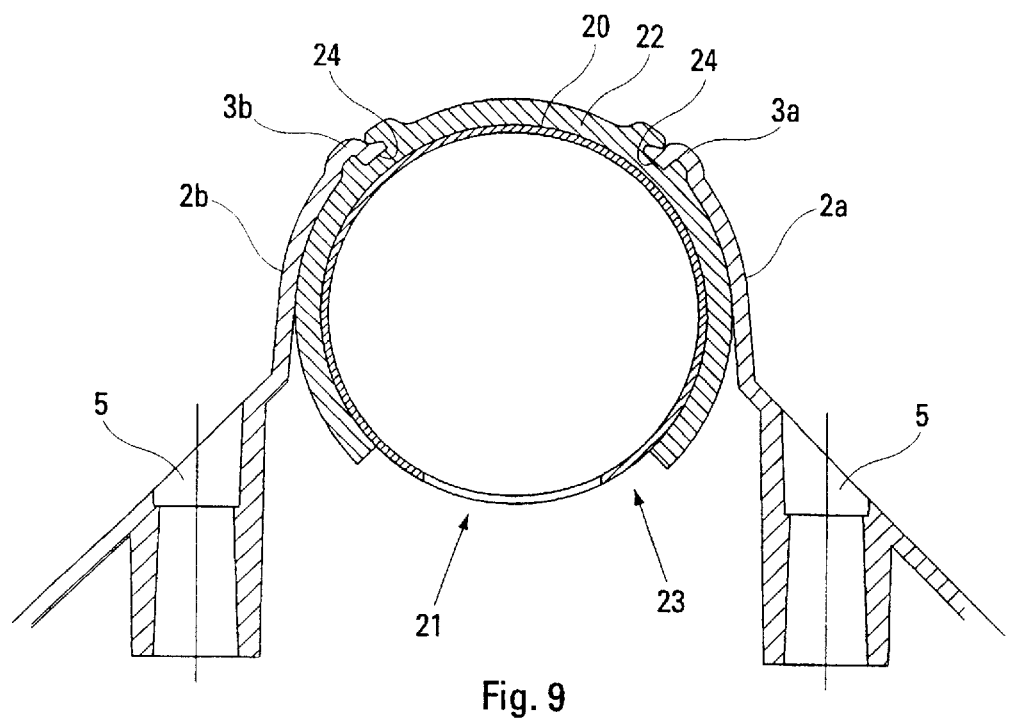
FIG. 9 shows on a larger scale a cross-section through the uppermost part of the feed cone mounted on a feed tube.

The fastening of the feed cone 1 to the feed tube by means of the lock part 22 will be described in more detail with reference to FIG. 9, which shows the feed cone's gripping element 2 with the lock part 22 and the feed tube 20 in cross-section and on a larger scale. As will be seen, the feed tube 20 has a downwards-facing outlet hole 21 for the feed. The gripping element 2 with its side pieces 2a and 2b is pressed up over the feed tube 20, in that the distance between the edges 3a and 3b of the side pieces is less than the diameter of the feed tube. The gripping element 2, however, cannot be fastened on the feed tube by this means alone, which means that the lock part 22 is a necessary part of the feed pan. The configuration of this lock part 22 is partly tubular, in that an opening 23 is formed downwards. This opening 23, which can extend along the whole longitudinal direction of the lock part, can for example in the transverse direction have a greater extent than the outlet hole 21 in the feed tube, but must be at least of the same size in the transverse direction as the outlet hole 21. The lock part 22 can, for example, be resilient, so that it can be pressed down around the feed tube 20, and when the feed pan gripping element 2 is placed on the feed tube, the lock part 22 can be pushed into the gripping element 2 from the side. The uppermost part of the lock part 22 is configured with a pair of longitudinal locking grooves 24 with which the locking edges 3a and 3b on the side pieces 2a and 2b can enter into engagement when the lock part 22 is pushed sideways into the gripping element 2. Hereafter, the feed pan is effectively secured on the feed tube 20, but in such a manner that the feed pan and the feed tube can be turned in relation to one another.

Figure 10:
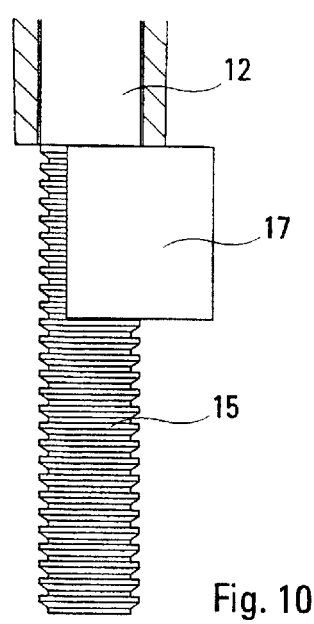
FIG. 10 shows on a larger scale and from the side a view of a threaded rod and associated nut with which the feed pan's bottom pan is secured.
Figure 11:
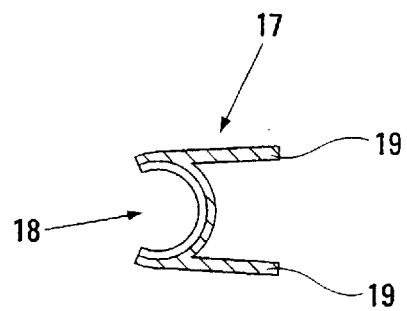
FIG. 11 shows a cross-section of the nut shown in FIG. 10.

In the following, the fastening of the bottom pan 10 to the feed cone 1 by means of the threaded rod 15 will be described in more detail with reference to FIGS. 10 and 11. In FIG. 10 on a larger scale there is shown a side view of the threaded rod 15 on which a nut 17 is mounted, in that a part of the bottom pan 10 in which the central mounting hole 12 for the pan is provided is shown in cross-section. In FIG. 11 a cross-section of the mounting nut 17 is shown, and it is seen that this has an opening 18 which extends in the axial direction and is of such a size that the elastic or resilient nut 17 can be "clipped" on the threaded rod 15 from the side. The nut 17 is also configured with wall pieces or gripping fingers 19 which extend from the nut 17 in the opposite direction to the opening 18. When these two gripping fingers 19 are pressed together, the opening 18 will be enlarged, and can thus freely be removed from the threaded rod 15 when the opening in principal becomes broader than the diameter of the threaded rod.

Figure 12:
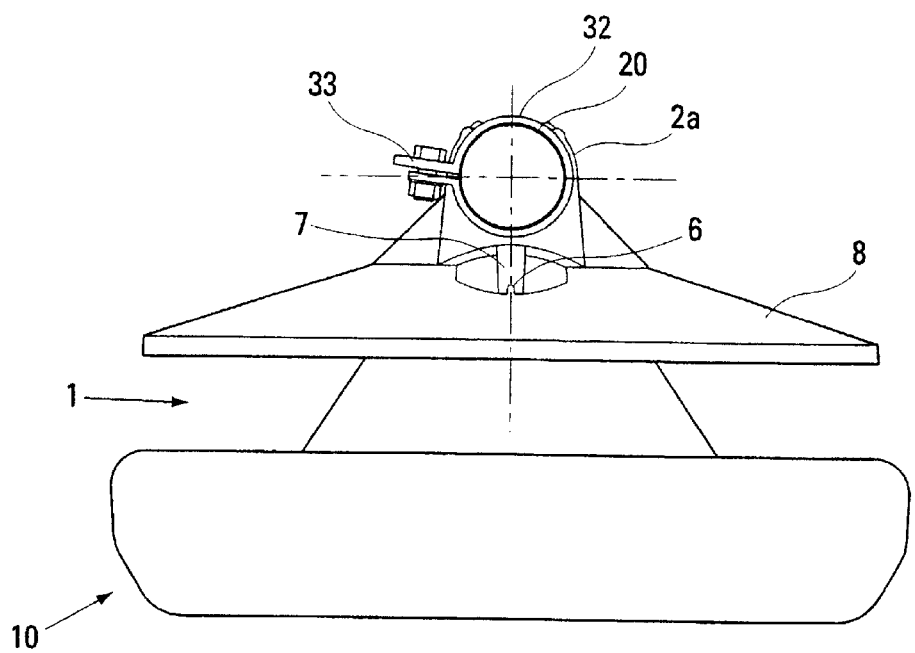
FIG. 12 shows a feed pan seen from the end, which feed pan is mounted on a feed tube together with a driving strap.
Figure 13:
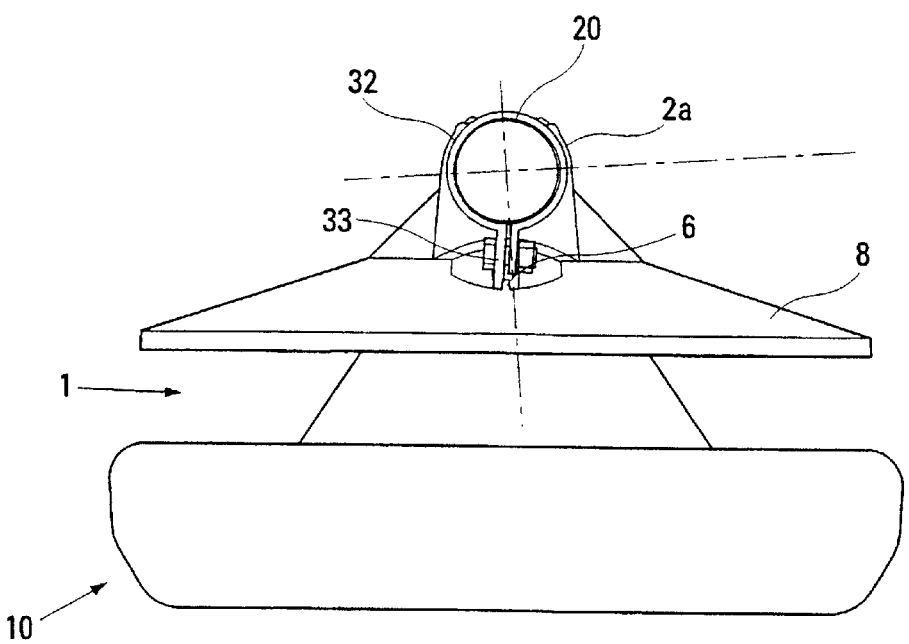
FIG. 13 shows a feed pan in the same way as in FIG. 12, but where the feed tube is turned approx. a quarter of a turn.

In the following, the function of the feed pan and the feeding system will be explained in more detail with reference to FIGS. 12 and 13, which show the feed pan (in a version in which it is mounted with the covering hood 8) seen from the side. In FIG. 12 the feed pan and the feed tube 20 are seen in a position in which the outlet hole in the feed tube 20 faces downwards, so that the feed which is transported forward in the feed tube will fall down through the outlet hole, down through the feed cone 1 and through the passage between the walls of the feed cone and the bottom pan and down into the bottom pan 10. The driving strap 32 is fastened on the feed tube 20 is such a position that the driving arm 33 extends almost horizontally out to the side of the feed tube. In FIG. 13 the feed tube is shown in a position in which it has been turned approx. a quarter of turn in the anticlockwise direction. In this position, the outlet hole in the feed tube will lie opposite the sidepiece 2a in the gripping element and will thus be closed off hereby. There is thus no connection from the feed tube 20 to the feed cone 1. In this position, the feed transport system, for example in the form of a not-shown worm conveyor in the feed tube 20, can convey feed into the feed tube until this is filled up. Hereafter, the feed tube can be turned back to its original position in which there is connection from the feed tube via the outlet holes to the feed pans on the feed tube. The worm can then be activated for a given period of time or for a given number of revolutions, so that a dosed amount of feed is dispensed down through each outlet hole to each feed pan. When feed is to be dispensed to the feed pans again, the sequence described is repeated.

As shown in FIG. 13, the driving arm 33 abuts up against the driving pin 6 on the feed cone, and with a further turning of the feed tube, the feed pan will be turned around with the feed tube. This can be used, for example, when the feed pans need to be emptied and cleaned, in that by means of the feed tube the feed pans are brought into a position where they hang more or less horizontally out to the side. In this position, the bottom pan can easily be removed from the feed cone, and the cleaning of the inside of the feed cone, for example by hosing down, can be carried out without water or cleaning agent gaining access to the feed tube and herewith to the feed contained in the fed tube.

Figure 14:
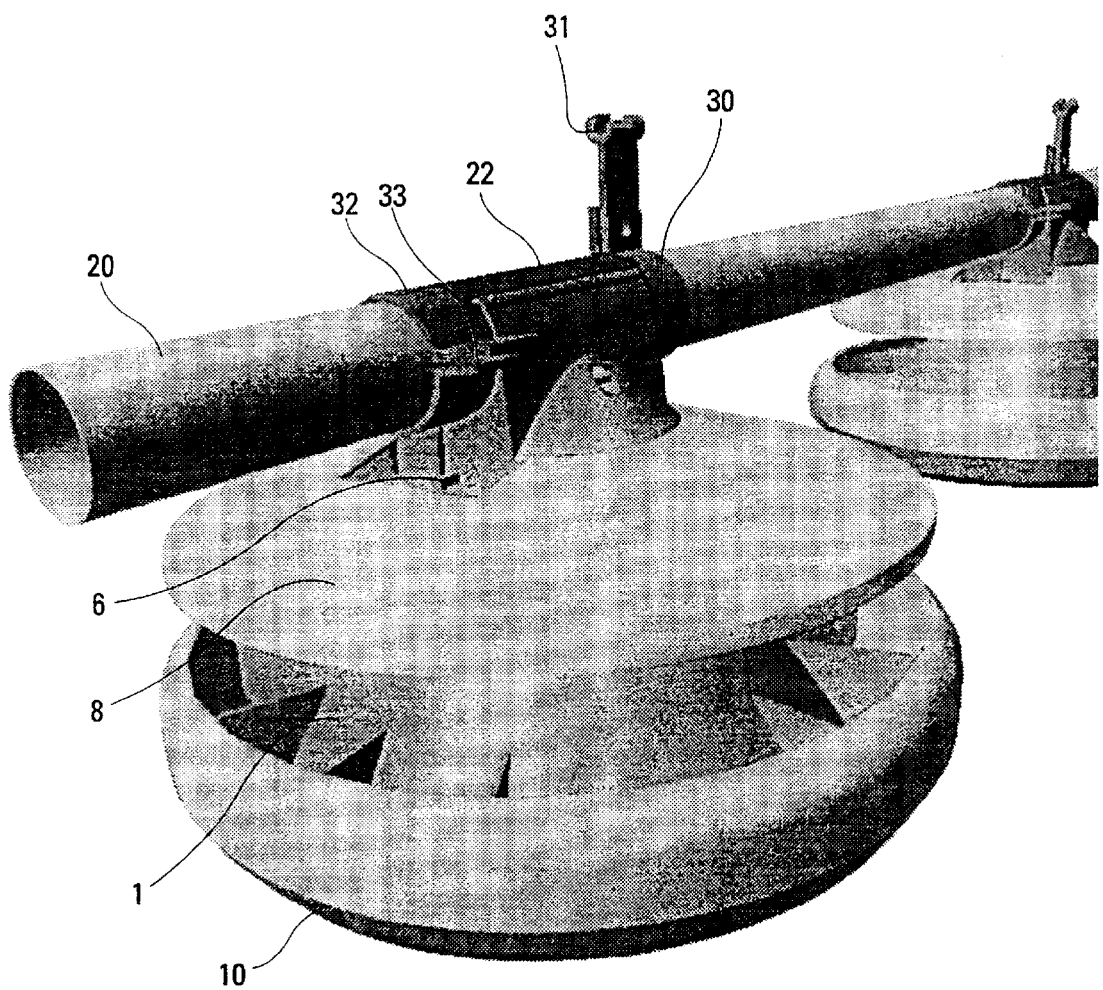
FIG. 14 is a perspective view of a feed tube on which two feed pans according to the invention are mounted.
Figure 15:
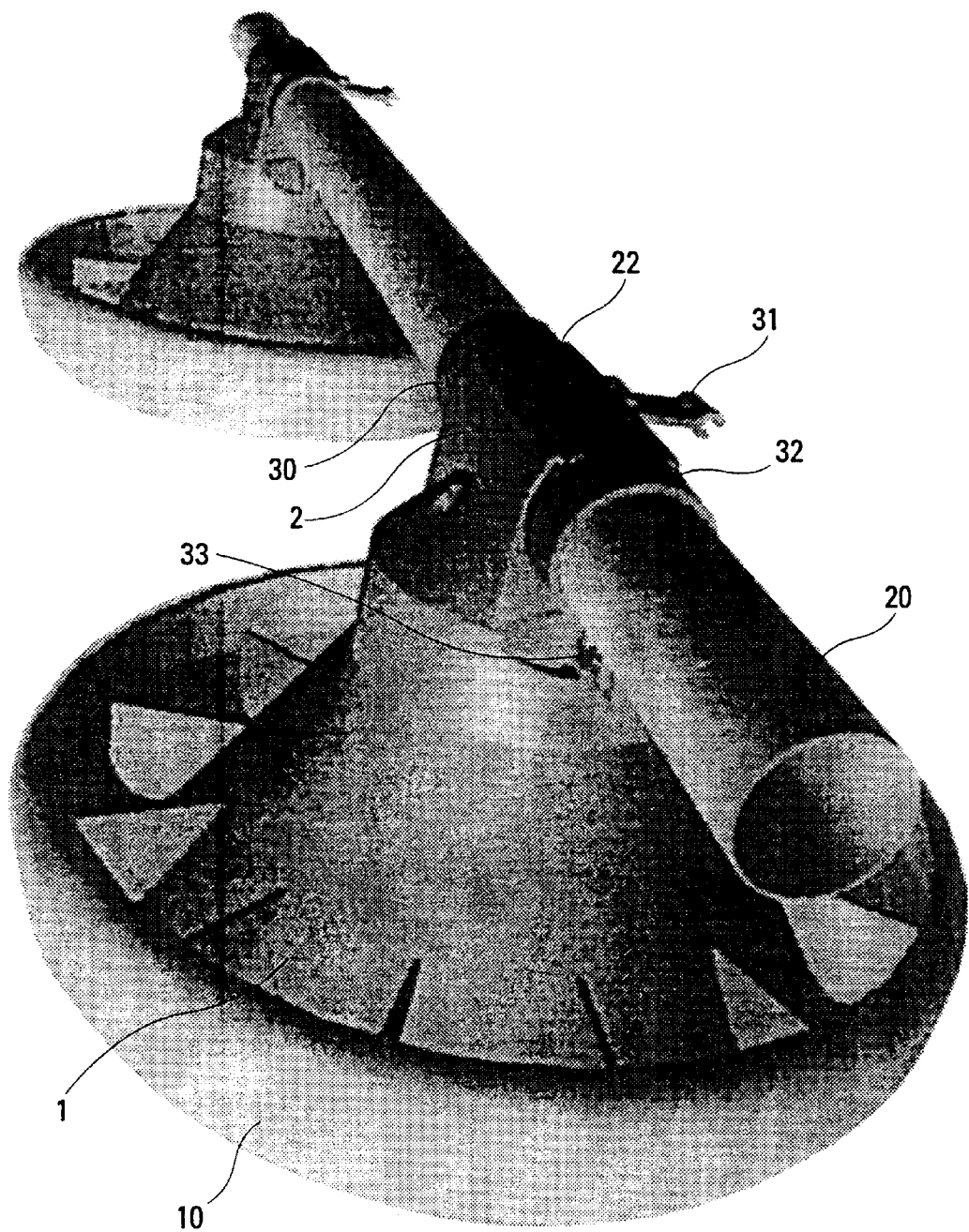
FIG. 15 is a perspective view of a feed tube with feed pans mounted, but with the feed tube turned approx. a quarter of a turn.

In FIGS. 14 and 15 perspective views of a feed tube 20 are shown on which two feed pans are mounted, where the feed pans in FIG. 14 are shown provided with covering hoods 8. In FIG. 14 the feed pans and the feed tube are shown in a normal position, where the gripping part 31 of the locking strap faces vertically upwards, so that the wire or the like (not shown) which is supported by the gripping part is disposed over the feed tube 20. The driving strap 32 is fastened in a position in which the driving arm 33 extends horizontally out to the side or sloping upwards, and in the position shown there is passage for the feed from the feed tube 20 to the bottom pan 10.

FIG. 15 shows another situation (where the feed pans shown are not provided with covering hoods 8), but similarly with a feed tube with two feed pans. Here, the feed tube has been turned approx. a quarter of a turn, so that the gripping arm 31 on the locking strap 30 extends out to the side, and the driving arm 33 on the driving strap 32 is in contact with the driving pin 6 (which is seen in FIG. 14). At the same time, the outlet hole in the feed tube 20 is effectively closed by the feed cone's gripping element. In this position, the feed tube can as mentioned above be filled up by the worm with the view to the dosing of a given amount of feed to each feed pan, or the feed tube can be turned even further with the view to emptying and cleaning.

The driving strap 32 can be disposed in other ways with the driving arm 33 in other suitable positions, depending on the wishes of the user with regard to functions. In particular, the driving strap can be disposed in such a manner that the driving arm 33 enters the slot 7, so that the feed pan will follow all the movements of the feed tube.

The various components are configured in suitable materials, preferably plastic materials, with the necessary characteristics regarding elasticity and durability and with the view to easy cleaning etc. It can be expedient for the feed cone to be configured in a transparent material, so that it can immediately be ascertained whether there is feed in the passage between the feed cone and the bottom pan.

Figure 17:
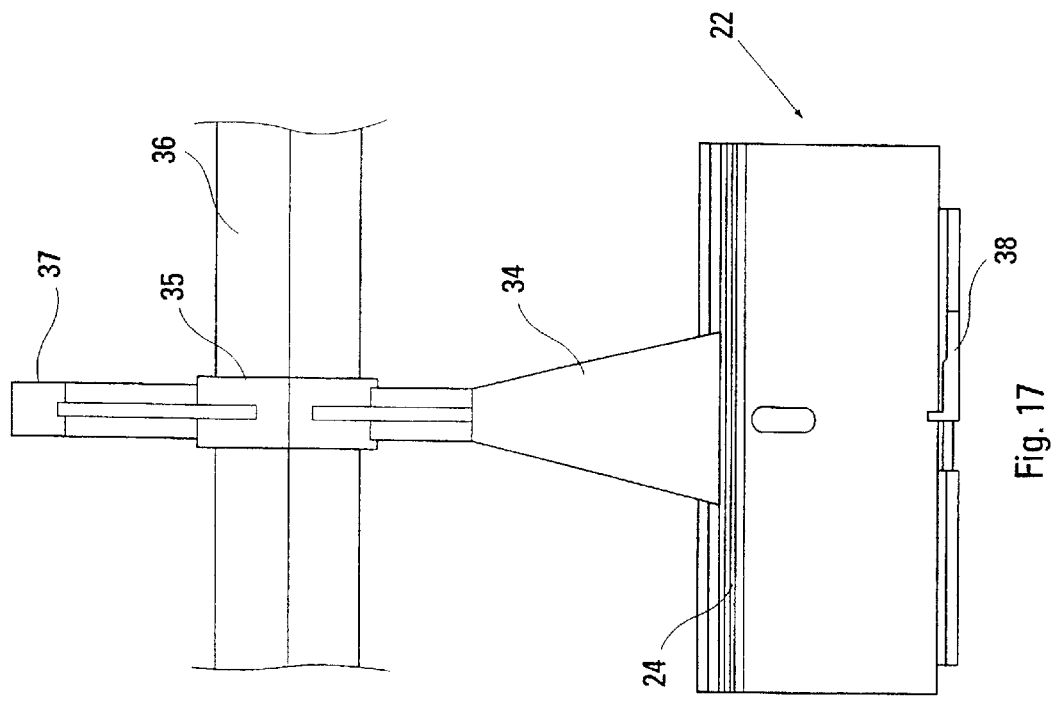
FIG. 17 shows the lock part shown in FIG. 16 seen from the side.
Figure 16:
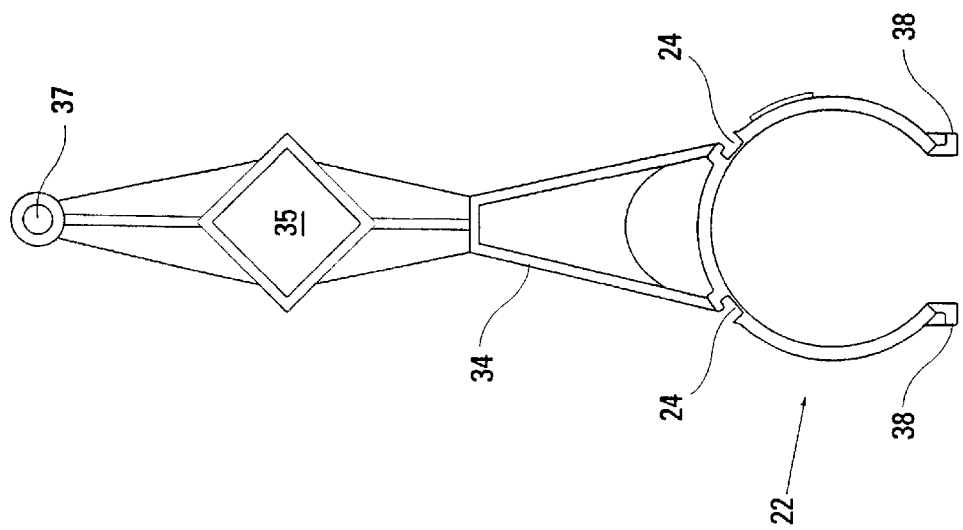
FIG. 16 shows a further embodiment of a lock part for a feed pan according to the invention, seen from the end and on a larger scale.

A further embodiment of a lock part 22 for use in connection with the feed pan according to the invention is shown in FIGS. 16 and 17. The lowermost part of this lock part is configured in substantially the same manner as the lock part, which is shown in connection with FIGS. 5–9, and thus it has locking grooves 24 which can co-operate with the locking edges 3a and 3b on the sidepieces 2a and 2b on the gripping element 2. Moreover, this embodiment of the lock part 22 is provided with an elongated arm 34, which, as shown, extends upwards from the lock part 22 itself, so that in the mounted condition it will extend vertically upwards when the feed pan hangs downwards from a feed tube.

The arm 34 is provided with a through-going hole 35, the axis of which extends parallel with the axis of the feed tube and, as shown in FIG. 16, it has a quadratic opening. Through this hole 35 a stabilising tube or a stabilising rod 36 with a cross-section corresponding to the hole can be introduced, such as shown in FIG. 17, where only a part of the stabilising tube 36 is shown. Thus, when several feed pans are placed on one and the same feed tube, a stabilising tube 36 can be inserted through the holes 35 on the arms 34 of these feed pans, so that the feed pans are controlled in relation to one another, i.e. they will all assume the same position. It is hereby avoided that a feed pan which, for example, has an increased friction in relation to the feed tube, e.g. due to dust or the remains of feed between the feed pan and the feed tube, gets stuck and does not move as expected on the feed tube. Due to the position of the remaining feed pans, and forced by the stabilising tube 36, such a feed pan will assume the same position as the remaining feed pans.

The shape of the cross-section of the hole 35 can be other than quadratic. It has proved, however, that this shape provides a greater stabilisation than when use is made, for example, of round holes, but other angular shapes can be considered. However, the quadratic shape is expedient in that tubes of this cross-section are directly accessible as stabilising tubes and have the necessary mechanical strength.

It is realised that the hole 35 must be situated at a suitable minimum distance from the feed tube in order for the desired effect to be achieved.

Above the hole 35, the arm 34 is provided with a through-going hole 37 through which a through-going wire or the like can be led. This wire serves in the same way as described earlier in connection with the gripping part 31, which is shown in FIG. 5, to prevent hens and chickens from perching on the stabilising tube 36.

Figure 19:
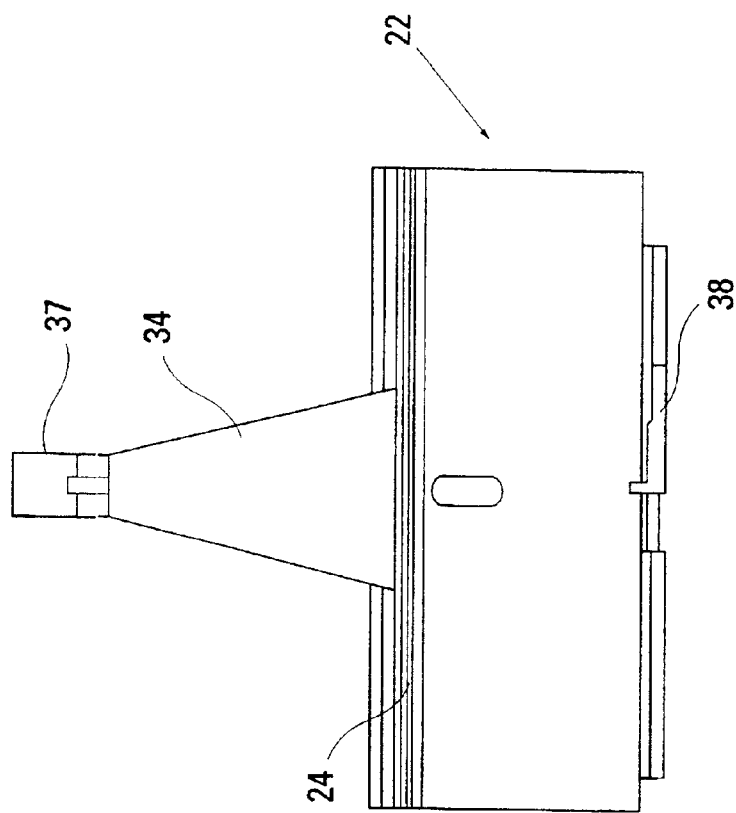
FIG. 19 shows the lock part shown in FIG. 18 seen from the side.
Figure 18:
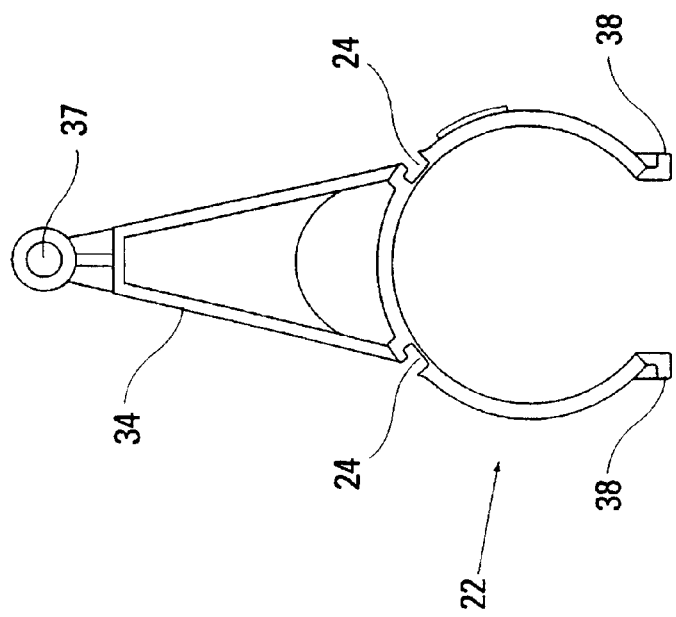
FIG. 18 shows yet another embodiment of a lock part seen from the end.

Yet another embodiment of a lock part 22 for use in connection with the feed pan according to the invention is shown in FIGS. 18 and 19. With this embodiment, the arm 34 is not provided with a hole for a stabilising tube or the like, but is provided solely with a through-going hole 37 for a through-going wire or the like, which as explained earlier serves to prevent poultry from perching on the feed tube. There is thus no need for a gripping part 31 on the locking strap 30, such as shown by way of example in FIG. 5. Consequently, the arm 34 on this lock part can also be shorter than the corresponding arm shown in FIGS. 16 and 17. Apart from this, the further embodiment shown for a lock part is configured in the same way as the lock part shown in FIGS. 16 and 17.

The lowermost parts of the lock parts 22 shown in FIGS. 16–19 are also provided with locking elements 38, the function of which will be described later.

Figure 7:
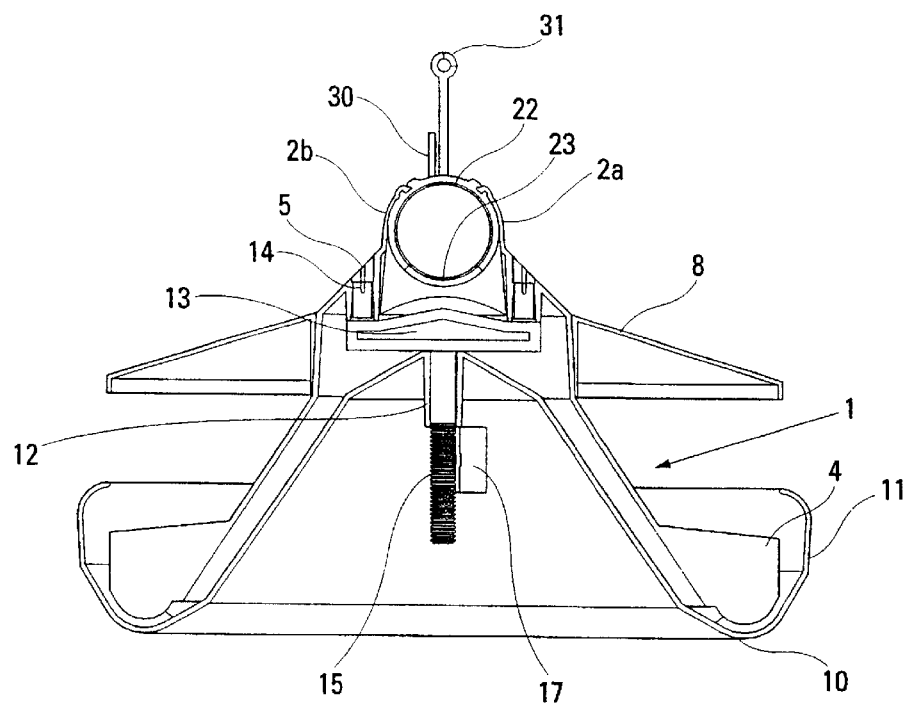
FIG. 7 shows a cross-section of the feed pan along the line VII—VII in FIG. 6.
Figure 8:
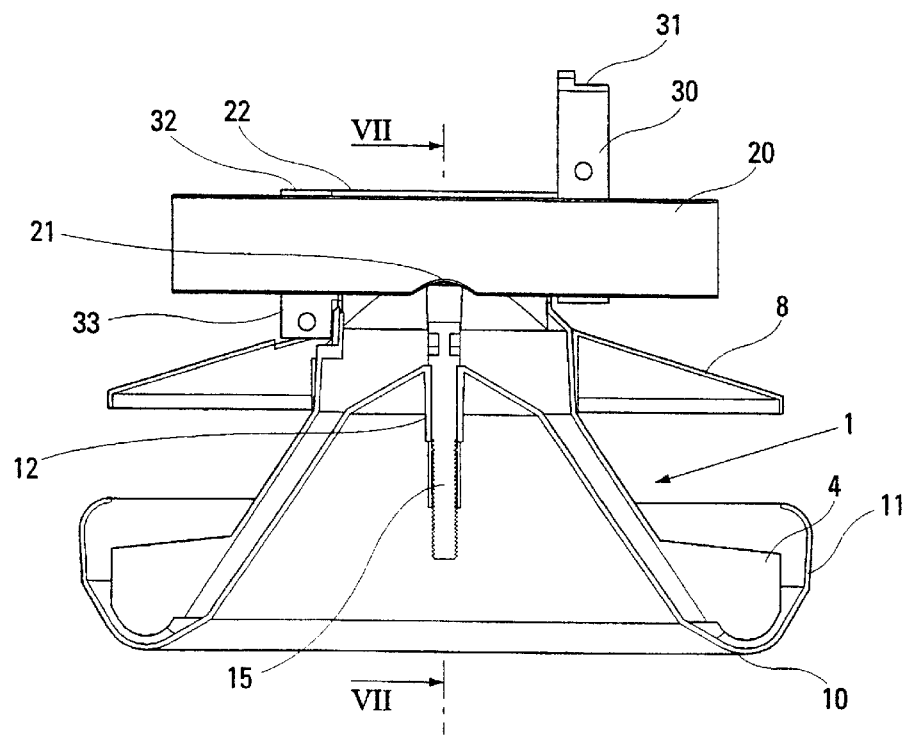
FIG. 8 shows a longitudinal section of the feed pan along the line VIII—VIII in FIG. 6.
Figure 21:
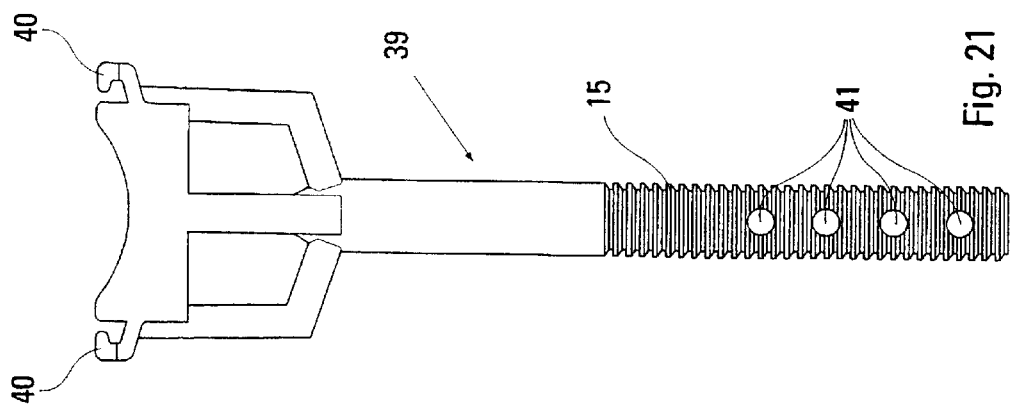
FIG. 21 shows the mounting part in FIG. 20 seen from a side perpendicular to the side shown in FIG. 20.
Figure 20:
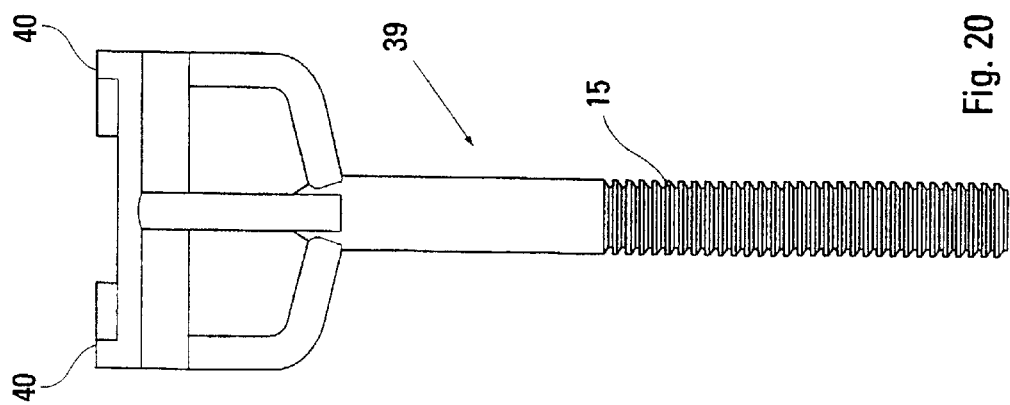
FIG. 20 shows a further embodiment of a mounting part, seen from the side and on a larger scale.

FIGS. 20 and 21 show a mounting part 39 with a threaded rod 15, which mounting part can be used instead of the threaded rod 15 with associated mounting bridge 13 described earlier, and which is shown by way of example in FIGS. 7 and 8. As shown, the mounting part 39 is provided at the top with locking elements 40, which can co-operate with the locking elements 38 shown in FIGS. 16–19, such as will be described in connection with FIG. 22. As will be seen in FIGS. 20 and 21, the locking elements are configured with inwardly-projecting edge parts which extend partly in the longitudinal direction of the mounting part, while the locking elements 38 are configured with outwardly-extending edge parts which extend partly in the longitudinal direction of the lock parts 22, such as shown in FIGS. 16–19. Finally, as shown in FIG. 21, the threaded rod 15 is provided with a number of through-going holes 41 which can be used for the fastening of a bottom pan 10, in that a split-pin or the like can be inserted through these holes so that a mounting nut 17 or the like can be dispensed with.

Figure 22:
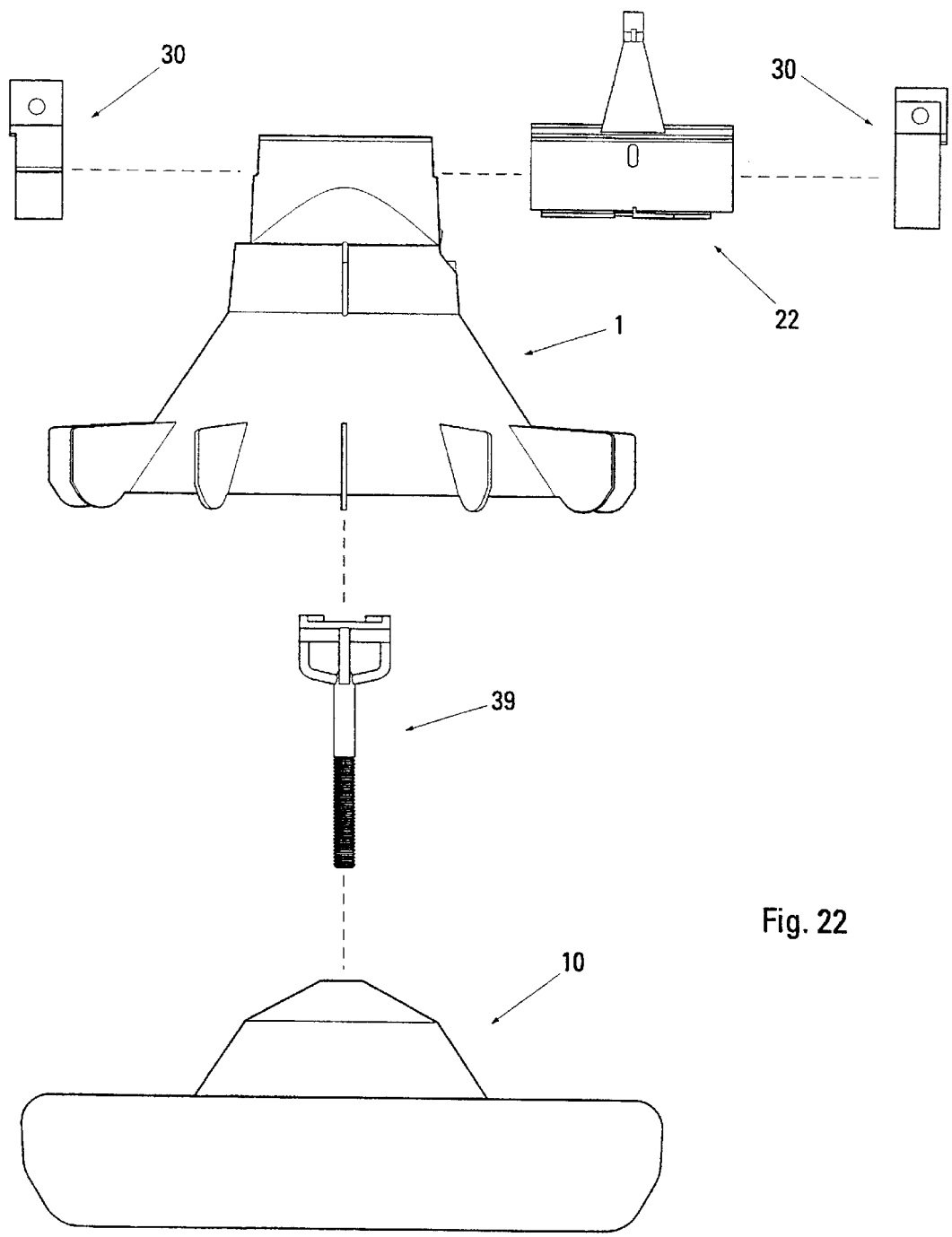
FIG. 22 shows an example of the parts, which are used in the assembly of a feed pan according to the invention.

In FIG. 22 is shown the assembly of a feed pan according to the invention while making use of the above-mentioned mounting part 39 in connection with a lock part 22 with locking elements 38. It is thus seen that a feed cone 1 is pressed up around a feed tube as described earlier. Hereafter, a lock part 22 is introduced from the side into the uppermost part of the feed pan 1, in that the feed cone's locking edges 3a and 3b as described earlier enter into engagement with the locking grooves 24 on the lock part. In order to maintain the position in the longitudinal direction of the feed tube, locking straps 30 are hereafter mounted on each side of the feed pan. The mounting part 39 can now be mounted from below, in that via a sideways movement it can be locked firmly or clipped firmly to the lowermost part of the lock part 22. This is effected by the locking elements 40 on the mounting part 39 entering into engagement with the locking elements 38 on the lowermost part of the lock part 22. Finally, a bottom pan 10 can now be mounted, in that this can be secured either by means of a nut on the threaded rod 15 of the mounting part, or by means of a split-pin or the like which is placed in a suitable through-going hole 41 in the threaded rod 15 (FIG. 21).

In the above, it is described that use is made of a bottom pan 10, which in shape and size is arranged to fit the feed cone 1. However, the bottom pan can be considerably larger and of another shape, and it is not necessarily mounted on the feed cone 1. For example, use can thus be made of a bottom pan, which is placed on a floor underneath the feed cone, and the bottom pan can also be one, which is elongated and extends under several feed cones. From these feed cones, feed can thus be dosed down into a common bottom pan. This can be expedient, for example, in connection with poultry of larger species, or in connection with other domestic animals, e.g. pigs. Moreover, dosing can take place directly down onto the floor if this is desirable.

In this connection it can be mentioned that, for example, while a feed tube can normally have a diameter of approx. 45 mm, and where feed types with coarser particles or parts are dosed, it can be expedient for use to be made of a feed tube with a larger diameter, where the respective parts of the feed pan according to the invention must also be correspondingly modified. For example, it can be mentioned that feed tubes of up to approx. 150 mm in diameter can be used. Furthermore, it should be mentioned that bedding can be dosed instead of feed, for example in the form of wood shavings, sawdust or the like, chaff, or other similar materials, possibly mixed with the feed, where the dosing must thus naturally take place directly on the under layer or the floor, but where the dosing otherwise takes place in the same manner as described earlier.

What is claimed is:

1. Feed pan for poultry, especially for chickens and hens, for use in connection with a tube feeding system, said feed pan comprising a feed cone (1) under which a bottom pan (10) is mounted, in that the feed cone (1) has mounting elements for mounting on a feed tube (20), so that feed or similar material can flow from an outlet hole (21) in the feed tube (20) through the feed cone (1) and down into the bottom pan (10), and where the feed cone (1) and the feed tube (20) can be turned in relation to each other around the axis of the feed tube, characterised in that the feed cone (1) is configured in such a manner that after a first turning of the feed tube (20) in relation to the feed cone (1), the outlet hole (21) in the feed tube will be closed off, and in that the mounting elements for the feed cone are configured in such a manner that the mounting elements comprise adjustable means which can be secured in relation to the feed tube (20), and which can co-operate with driving elements (6, 7) on the feed cone (1), so that the feed cone can also be turned together with the feed tube (20).

2. Feeding system for the feeding of poultry, especially hens and chickens, said feeding system comprising a feed tube (20) with a number of feed pans according to claim 1, a feed silo or a similar reservoir for feed or similar materials, and a transport system for conveying feed or similar materials through the feed tube (20) to the feed pans.

3. Feeding system according to claim 2, characterized in that the system is configured in such a manner that the feed tube (20) can be turned at any angle in relation to the normal position, and that the transport system for the feed or similar material through the feed tube is configured in a controllable manner, and such that an activation of the transport system for a given period of time will result in the transport of a given amount of feed or similar material through the feed tube.

4. Feed pan for poultry, especially for chickens and hens, for use in connection with a tube feeding system, said feed pan comprising a feed cone (1) under which a bottom pan (10) is mounted, in that the feed cone (1) has mounting elements for mounting on a feed tube (20), so that feed or similar material can flow from an outlet hole (21) in the feed tube (20) through the feed cone (1) and down into the bottom pan (10), and where the feed cone (1) and the feed tube (20) can be turned in relation to each other around the axis of the feed tube, characterized in that the feed cone (1) is configured in such a manner that after a first turning of the feed tube (20) in relation to the feed cone (1), the outlet hole (21) in the feed tube will be closed off, and in that the mounting elements for the feed cone are configured in such a manner that the mounting elements comprise adjustable means which can be secured in relation to the feed tube (20), and which can co-operate with driving elements (6, 7) on the feed cone (1), so that the feed cone can also be turned together with the feed tube (20); wherein the mounting elements comprise a driving strap (32) which can be fastened on the feed tube (20), and which has a driving arm (33) which can co-operate with driving elements (6, 7) on the feed cone (1).

5. Feed pan according to claim 4, characterized in that the driving elements (6, 7) on the feed cone (1) comprise a driving pin (6) with which the driving arm (33) can enter into engagement.

6. Feed pan according to claim 4, characterized in that the driving elements (6, 7) on the feed cone (1) comprise a driving slot or recess (7) with which the driving arm (33) can enter into engagement.

7. Feed pan for poultry, especially for chickens and hens, for use in connection with a tube feeding system, said feed pan comprising a feed cone (1) under which a bottom pan (10) is mounted, in that the feed cone (1) has mounting elements for mounting on a feed tube (20), so that feed or similar material can flow from an outlet hole (21) in the feed tube (20) through the feed cone (1) and down into the bottom pan (10), and where the feed cone (1) and the feed tube (20) can be turned in relation to each other around the axis of the feed tube, characterized in that the feed cone (1) is configured in such a manner that after a first turning of the feed tube (20) in relation to the feed cone (1), the outlet hole (21) in the feed tube will be closed off, and in that the mounting elements for the feed cone are configured in such a manner that the mounting elements comprise adjustable means which can be secured in relation to the feed tube (20), and which can co-operate with driving elements (6, 7) on the feed cone (1), so that the feed cone can also be turned together with the feed tube (20), wherein the bottom pan (10) is mounted under the feed cone by means of a threaded rod (15) extending onwards in the feed cone (1), the bottom pan (10) is secured by means of a mounting nut (17) or by other means which co-operate with the threaded rod, the mounting nut (17) is configured with a through-going, longitudinal recess (18), and, extending opposite this recess, with a pair of gripping fingers (19) with which the grip of the mounting nut on the threaded rod (15) can be released.

8. Feed pan for poultry, especially for chickens and hens, for use in connection with a tube feeding system, said feed pan comprising a feed cone (1) under which a bottom pan (10) is mounted, in that the feed cone (1) has mounting elements for mounting on a feed tube (20), so that feed or similar material can flow from an outlet hole (21) in the feed tube (20) through the feed cone (1) and down into the bottom pan (10), and where the feed cone (1) and the feed tube (20) can be turned in relation to each other around the axis of the feed tube, characterized in that the feed cone (1) is configured in such a manner that after a first turning of the feed tube (20) in relation to the feed cone (1), the outlet hole (21) in the feed tube will be closed off, and in that the mounting elements for the feed cone are configured in such a manner that the mounting elements comprise adjustable means which can be secured in relation to the feed tube (20), and which can co-operate with driving elements (6, 7) on the feed cone (1), so that the feed cone can also be turned together with the feed tube (20), wherein the mounting elements comprise a gripping element (2) disposed on the top of the feed cone, which gripping element can surround a part of the feed tube (20), and a lock part (22) associated herewith which can be inserted into the gripping element (2) so that the feed cone (1) is fastened to the feed tube (20), the mounting elements also comprise parts for maintaining the position of the feed pan in relation to the longitudinal direction of the feed tube and the lock part (22) comprises an arm (34) which, in the mounted position of the lock part, extends from the top of the feed cone and substantially upwards, said arm having a through-going hole which is quadratic, and in which a tube or similar elongated element (36) can be mounted for the stabilization of the feed pan.

9. Feed pan according to claim 8, characterised in that the mounting elements comprise a gripping element (2) disposed on the top of the feed cone, which gripping element can surround a part of the feed tube (20) and a lock part (22) associated herewith which can be inserted into the gripping element (2) so that the feed cone (1) is fastened to the feed tube (20).

10. Feed pan according to claim 9, characterised in that the mounting elements also comprise parts for maintaining the position of the feed pan on relation to the longitudinal direction of the feed tube.

11. Feed pan according to claim 9, characterized in that the lock part (22) has locking elements (38) for securing a mounting part (39) with which a bottom pan (10) can be positioned.

12. Feed pan according to claim 8, characterized in that the bottom pan (10) is mounted under the feed cone by means of a threaded rod (15) extending downwards in the feed cone (1), in that the bottom pan (10) is secured by means of a mounting nut (17) or by other means which co-operate with the threaded rod.

13. Feed pan according to claim 8, characterized in that one or more of the parts constituting the feed pan have a gripping part (31,17) for the fastening of a wire or the like above the feed tube.

14. Feed pan for poultry, especially for chickens and hens, for use in connection with a tube feeding system, said feed pan comprising a feed cone (1) under which a bottom pan (10) is mounted, in that the feed cone (1) has mounting elements for mounting on a feed tube (20), so that feed or similar can flow from an outlet hole (21) in the feed tube (20) through the feed cone (1) and down into the bottom pan (10), and where the feed cone (1) and the feed tube (20) can be turned in relation to each other around the axis of the feed tube, characterized in that the feed cone (1) is configured in such a manner that after a first turning of the feed tube (20) in relation to the feed cone (1), the outlet hole (21) in the feed tube will be closed off, and in that the mounting elements for the feed cone are configured in such a manner that the mounting elements comprise adjustable means which can be secured in relation to the feed tube (20), and which can co-operate with driving elements (6, 7) on the feed cone (1), so that the feed cone can also be turned together with the feed tube (20), wherein the mounting elements comprise a gripping element (2) disposed on the top of the feed cone, which gripping element can surround a part of the feed tube (20), and a lock part (22) associated herewith which can be inserted into the gripping element (2) so that the feed cone (1) is fastened to the feed tube (20), the mounting elements also comprise parts for maintain the position of the feed pan in relation to the longitudinal direction of the feed tube, and the parts for maintaining the position of the feed pan comprise a driving strap (32) which is fastened on the feed tube (20) on one side of the feed pan, and a further locking strap which is fastened on the feed tube on the other side of the feed pan.

15. Feed pan for poultry, especially for chickens and hens, for use in connection with a tube feeding system, said feed pan comprising a feed cone (1) under which a bottom pan (10) is mounted, in that the feed cone (1) has mounting elements for mounting on a feed tube (20), so that feed or similar material can flow from an outlet hole (21) in the feed tube (20) through the feed cone (1) and down into the bottom pan (10), and where the feed cone (1) and the feed tube (20) can be turned in relation to each other around the axis of the feed tube, characterized in that the feed cone (1) is configured in such a manner that in response to a first turning of the feed tube (20) in relation to the feed cone (1), the outlet hole (21) in the feed tube is closed off.

16. Feed pan according to claim 15, characterized in that the mounting elements for the feed cone are configured in such a manner that the mounting elements comprise adjustable means which are securable in relation to the feed tube (20), and which are operatively associated with driving elements (6, 7) on the feed cone (1), so that the feed cone can also be turned together with the feed tube (20).

17. Feed pan according to claim 15, characterized in that the mounting elements comprise a driving strap (32) which is fastenable on the feed tube (20), and which has a driving arm (33) operatively associated with driving elements (6, 7) on the feed cone (1).

18. Feed pan according to claim 16, characterized in that the mounting elements comprise a driving strap (32) which is fastenable on the feed tube (20), and which has a driving arm (33) operatively associated with driving elements (6, 7) on the feed cone (1).

19. Method for feeding poultry, especially chickens and hens, said method comprising conveyance of feed by a worm conveyer adapted to convey feed in a feed tube having outlet holes, through which feed can be dispensed to a plurality of feed cones, under each of which a feed pan is mounted, and where the feed cones and the feed tube can be turned in relation to each other, characterized in the following steps:

a) before transporting the feed by means of the worm conveyer in the feed tube, the feed tube is turned into a position, in which the outlet holes of the feed tube are disconnected from the feed pans, b) when the feed tube is filled up, the feed tube is turned back to the position, in which the outlet holes are connected to the feed pans, and c) steps a) and b) are repeated.

* * * * *